US008944491B2

(12) United States Patent
Neumann et al.

(10) Patent No.: US 8,944,491 B2
(45) Date of Patent: Feb. 3, 2015

(54) WIND DEFLECTOR

(71) Applicants: Peter Neumann, Oberstenfeld (DE);
Joerg Riehle, Asperg (DE)

(72) Inventors: Peter Neumann, Oberstenfeld (DE);
Joerg Riehle, Asperg (DE)

(73) Assignee: Scambia Holdings Cyprus Limited,
Limassol (CY)

(*) Notice: Subject to any disclaimer, the term of this patent is extended or adjusted under 35 U.S.C. 154(b) by 0 days.

(21) Appl. No.: 13/836,049

(22) Filed: Mar. 15, 2013

(65) Prior Publication Data

US 2013/0257092 A1    Oct. 3, 2013

(30) Foreign Application Priority Data

Mar. 28, 2012 (DE) .......................... 10 2012 102 671

(51) Int. Cl.
*B62D 35/00* (2006.01)
*B60J 7/22* (2006.01)

(52) U.S. Cl.
CPC *B62D 35/005* (2013.01); *B60J 7/22* (2013.01)
USPC .......................................... 296/180.5; 296/91

(58) Field of Classification Search
CPC ...................................................... B62D 35/007
USPC ................... 296/38, 190.1, 187, 180.1–180.5, 296/216.01–216.09, 217, 91
IPC ........................................................ B62D 35/00
See application file for complete search history.

(56) References Cited

U.S. PATENT DOCUMENTS

| | | | |
|---|---|---|---|
| 1,928,306 A * | 9/1933 | Brennan | 89/36.08 |
| 1,981,897 A * | 11/1934 | Bishop | 296/95.1 |
| 2,932,370 A * | 4/1960 | Bruder et al. | 192/219 |
| 2,979,165 A * | 4/1961 | McCambridge | 188/270 |
| 3,328,074 A * | 6/1967 | Van Rossem | 296/180.1 |
| 3,596,974 A * | 8/1971 | Adams | 296/180.2 |
| 4,206,942 A * | 6/1980 | Nudo et al. | 296/180.5 |
| 5,092,648 A * | 3/1992 | Spears | 296/180.3 |

(Continued)

FOREIGN PATENT DOCUMENTS

| | | |
|---|---|---|
| DE | 3932739 A1 | 4/1991 |
| DE | 10217659 A1 | 11/2003 |

(Continued)

*Primary Examiner* — Pinel Romain
(74) *Attorney, Agent, or Firm* — Reinhart Boerner Van Deuren P.C.

(57) ABSTRACT

In a wind deflector for installation in a vehicle roof in a front area, comprising a wind deflector body which extends in a direction of extension transversely to a direction of travel, a lifting device, with which the wind deflector body can be moved between a position retracted into the vehicle roof and a position extended out of the vehicle roof and projecting beyond a contour of the upper side of the vehicle roof and thus deflecting wind, wherein the lifting device has at least one lifting unit with a mounting base and a lifting arm which is mounted with a lifting arm bearing for pivoting about a first pivot axis relative to the mounting base and engages on the wind deflector body at an end located opposite the lifting arm bearing, in order to achieve a reliable movability of the wind deflector body with devices which are as mechanically simple as possible it is suggested that an actuating unit which is supported on the mounting base and engages on the lifting arm be provided for moving the lifting arm and that the actuating unit and the lifting arm bearing be displaceable relative to one another in a direction of displacement extending transversely to the first pivot axis of the lifting arm bearing for the purpose of pivoting the lifting arm.

27 Claims, 11 Drawing Sheets

(56) References Cited

U.S. PATENT DOCUMENTS

| | | | |
|---|---|---|---|
| 5,141,281 A * | 8/1992 | Eger et al. | 296/180.5 |
| 5,538,316 A * | 7/1996 | Bartholomew | 296/180.5 |
| 5,636,892 A * | 6/1997 | Gordon | 296/95.1 |
| 6,030,028 A * | 2/2000 | Radmanic et al. | 296/180.5 |
| 6,039,385 A * | 3/2000 | Husted | 296/180.3 |
| 6,688,682 B2 * | 2/2004 | Arthur et al. | 296/216.02 |
| 7,878,582 B2 | 2/2011 | Fidan et al. | |
| 8,267,465 B2 * | 9/2012 | Wetzels et al. | 296/180.1 |
| 2013/0221701 A1 * | 8/2013 | De Luca | 296/180.5 |

FOREIGN PATENT DOCUMENTS

| | | |
|---|---|---|
| DE | 102006023912 A1 | 11/2007 |
| EP | 0895889 A2 | 2/1999 |

\* cited by examiner

WIND DEFLECTOR

CROSS-REFERENCE TO RELATED PATENT APPLICATION

This patent application claims the benefit of German application No. 10 2012 102 671.8, filed Mar. 28, 2012, the teachings and disclosure of which are hereby incorporated in their entirety by reference thereto.

BACKGROUND OF THE INVENTION

The invention relates to a wind deflector for installation in a front area of a vehicle roof, in particular between a windshield and a roof cutout, comprising a wind deflector body which extends in a direction of extension transversely to a direction of travel, a lifting device, with which the wind deflector body is movable between a position retracted into the vehicle roof and a position extended out of the vehicle roof and projecting beyond a contour of the upper side of the vehicle roof and thus deflecting wind, wherein the lifting device has at least one lifting unit with a mounting base and a lifting arm which is mounted with a lifting arm bearing for pivoting about a first pivot axis relative to the mounting base and which engages on the wind deflector body at an end located opposite the lifting arm bearing.

Wind deflectors of this type are known from the state of the art, for example EP 0 895 889 A1.

With this known solution the object is, however, to achieve a reliable movability of the wind deflector body with devices which are as mechanically simple as possible.

SUMMARY OF THE INVENTION

This object is accomplished in accordance with the invention, in a wind deflector of the type described at the outset, in that an actuating unit which is supported on the mounting base and engages on the lifting arm is provided for moving the lifting arm and that the actuating device and the lifting arm bearing can be displaced relative to one another in a direction of displacement which extends transversely to the first pivot axis of the lifting arm bearing for the purpose of pivoting the lifting arm.

The advantage of the solution according to the invention is to be seen in the fact that as a result a simple actuation of the lifting arm can be realized and this allows the wind deflector body, on the one hand, to be moved between the retracted position and the extended position and, on the other hand, to be held securely both in the extended and in the retracted position.

Such a relative displacement of the actuating device and the lifting arm bearing may be realized in the most varied of ways.

One advantageous solution, for example, provides for a displaceable slide, which can be displaced in the direction of displacement, to be provided for the displacement of the actuating unit and the lifting arm bearing relative to one another.

Such a displaceable slide represents a mechanical component which is simple to realize.

In this respect, it is provided, in particular, for the displaceable slide to be guided on the mounting base by means of a displacement guide so that, as a result, the actuating unit can be realized simply and inexpensively.

No further details have been given regarding the coupling between the actuating unit and the lifting arm; for example, the actuating unit could form, with the lifting arm, a pivot lever system or a toggle lever system.

One advantageous solution provides for the actuating unit to engage on a guide path of the lifting arm with a guiding element which can be displaced along the guide path and for the guiding element to be movable along the guide path for the purpose of pivoting the lifting arm.

This results in a solution for the coupling between the actuating unit and the lifting arm which is of a mechanically simple design.

In this respect, it is expediently provided for the guide path to extend in longitudinal direction of the lifting arm.

Furthermore, it is preferably provided for the guiding element to be pivotable relative to the guide path.

One specific realization of the actuating unit provides, in particular, for the actuating unit to have an actuating arm which bears the guiding element and extends from an actuating base.

The solutions described thus far have been based merely on a relative movement of the actuating unit and the lifting arm bearing relative to one another.

In this respect, it is possible to move either the actuating unit or the lifting arm bearing or both at the same time in order to generate this relative movement.

It has, however, proven to be particularly favorable from a constructional point of view when the displaceable slide which can be displaced relative to the lifting arm bearing in the direction of displacement forms the actuating base.

In this respect, it is provided, in particular, for the lifting arm bearing to be arranged securely on the mounting base whereas the displaceable slide can be displaced relative to the mounting base.

With respect to the coupling between the lifting arm and the wind deflector body, no further details have so far been given.

One particularly favorable solution, for example, provides for the lifting arm to be coupled to the wind deflector body with its end engaging on the wind deflector body by means of a retaining guide and to hold the body in the respective positions relative to the mounting base.

This solution creates the possibility, in a particularly advantageous manner, of obtaining a sufficiently reliable coupling between the lifting arm and the wind deflector body which predetermines the individual positions in a defined manner.

In this respect, it is provided, in particular, for the lifting arm to be pivotable relative to the wind deflector body about a second pivot axis, which is parallel to the first pivot axis, as a result of the retaining guide.

In this respect, it is provided, in particular, for the second pivot axis to extend transversely to the direction of extension of the wind deflector body.

An additional, advantageous solution provides for the retaining guide to allow, on the one hand, pivoting of the lifting arm about the second pivot axis and, on the other hand, movement of the second pivot axis in the direction of extension of the wind deflector body.

As a result, it is also possible to arrange the lifting arm bearing stationarily relative to the mounting base and, on the other hand, to create the possibility, as a result of the retaining guide, of the end of the lifting arm which engages on the retaining guide moving relative to the wind deflector body in its direction of extension.

Such movement may be realized, in particular, in that the retaining guide has a connecting link path, along which a guide pin, which forms the second pivot axis, can be moved.

In order, in addition, to prevent the wind deflector from moving in its direction of extension when a movement thereof by the lifting units between the retracted and the extended positions is intended to take place, it is preferably provided for the wind deflector body to be guided by a guiding unit which prevents any movement of the wind deflector body in the direction of extension.

The guiding unit could be a simple linear guide, wherein a linear guide is problematic, if not unsuitable for any installation in the region of a vehicle roof.

For this reason, one advantageous solution provides for the guiding unit to have a toggle lever guide.

A toggle lever guide may be folded out and folded up in a simple manner and so it may be advantageously used in the region of a vehicle roof.

It is expediently provided for the toggle lever guide to be pivotable about articulated axles which extend transversely to the first pivot axis.

It is provided, in particular, for the articulated axles of the toggle lever guide to extend at right angles to the first pivot axis.

In conjunction with the preceding explanations of the individual embodiments it has merely been assumed that the lifting device has at least one lifting unit.

It is, however, of advantage for the stable guidance of the wind deflector body when the lifting device has several lifting units.

Expediently, such several lifting units are arranged symmetrically to the longitudinal central plane of the vehicle roof.

In addition, it is advantageously provided for the at least one lifting unit or the lifting units to be drivable by a common drive unit.

Such a common drive unit could be provided laterally in the vehicle roof.

For reasons of an advantageous installation, it has, however, proven to be expedient when the drive unit is arranged in a central region of the wind deflector.

Furthermore, it has proven to be expedient when the drive unit is designed as a linear drive since the lifting units provided in accordance with the invention may be driven advantageously with a linear drive.

A particularly favorable installation situation results when the drive unit drives lifting units, which are arranged on oppositely located sides thereof, synchronously with one another.

A particularly favorable solution provides for the drive unit to perform push-pull movements extending symmetrically to the longitudinal central plane of the vehicle roof.

Additional features and advantages of the invention are the subject matter of the following description as well as the drawings illustrating several embodiments.

DETAILED DESCRIPTION OF THE INVENTION

Figure 1:
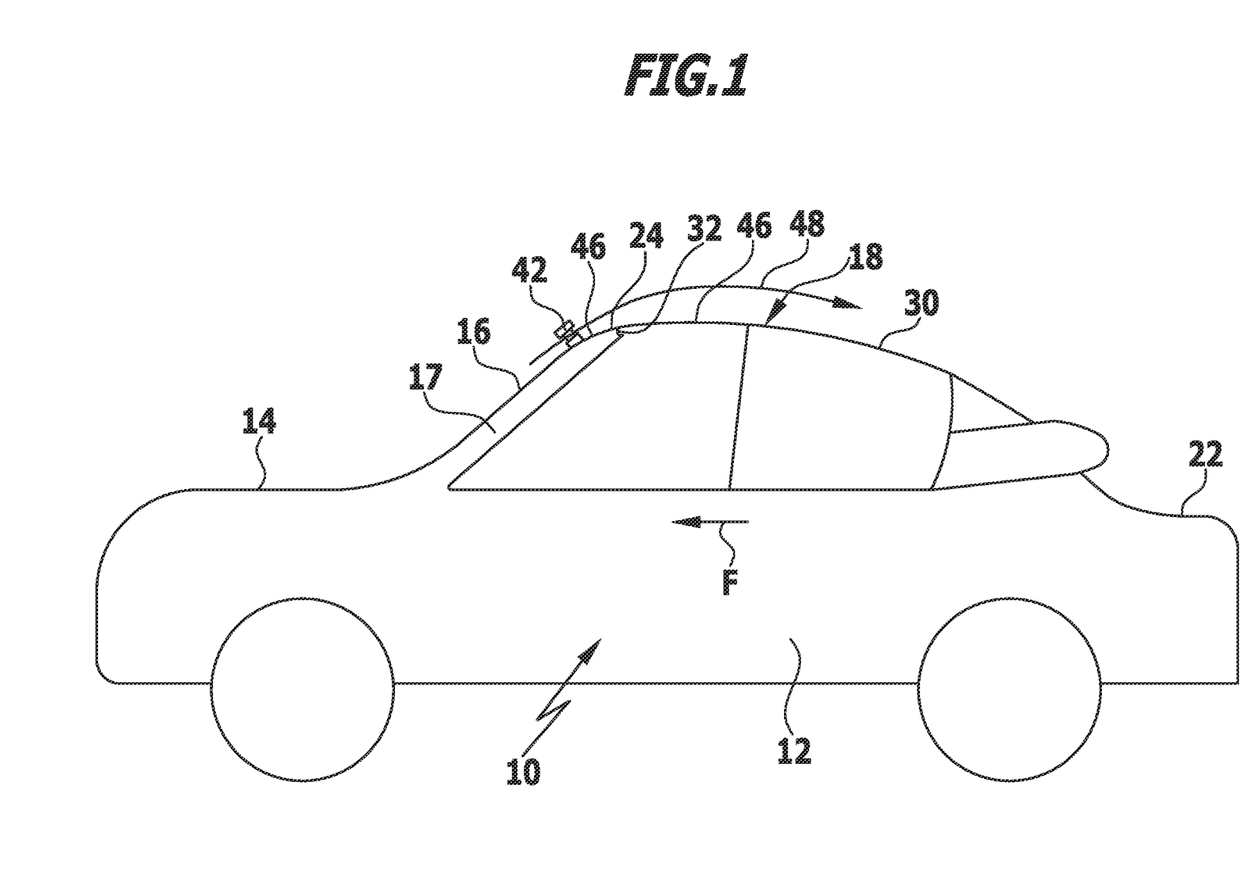
FIG. 1 shows a side view of a motor vehicle according to the invention with a wind deflector.

A motor vehicle, in particular a convertible vehicle, which is illustrated in FIG. 1 and designated as a whole as 10, has a vehicle body 12 which comprises inter alia—when observed in the direction contrary to a direction of travel F—a hood 14, a windshield 16 arranged adjoining the hood 14, a vehicle roof 18 adjoining the windshield 16, possibly a rear window 20 and a trunk lid 22.

Figure 2:
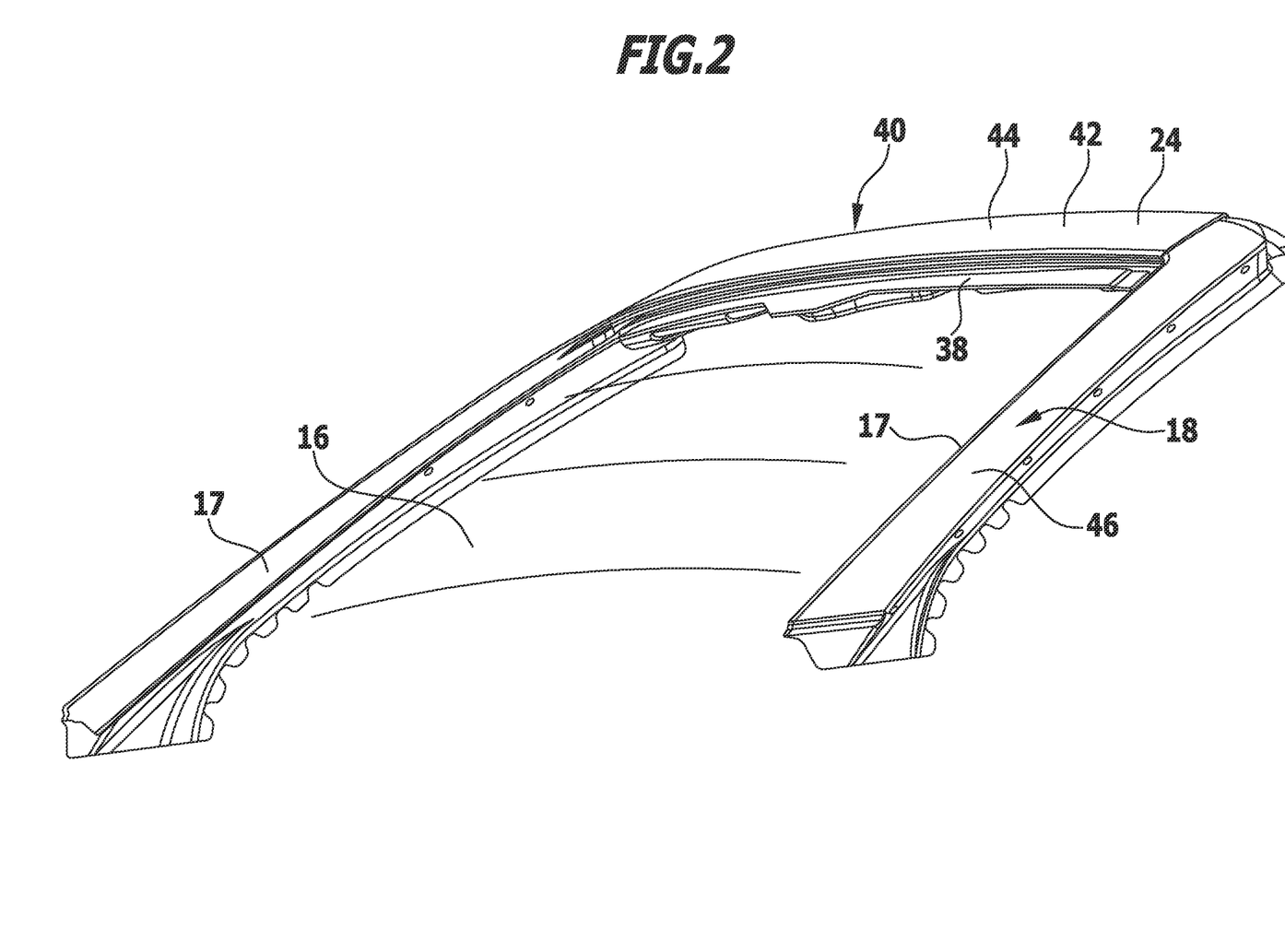
FIG. 2 shows a perspective view from the front of a bodywork cutout for a wind deflector body of the wind deflector positioned in the retracted position in the region of the windshield.
Figure 3:
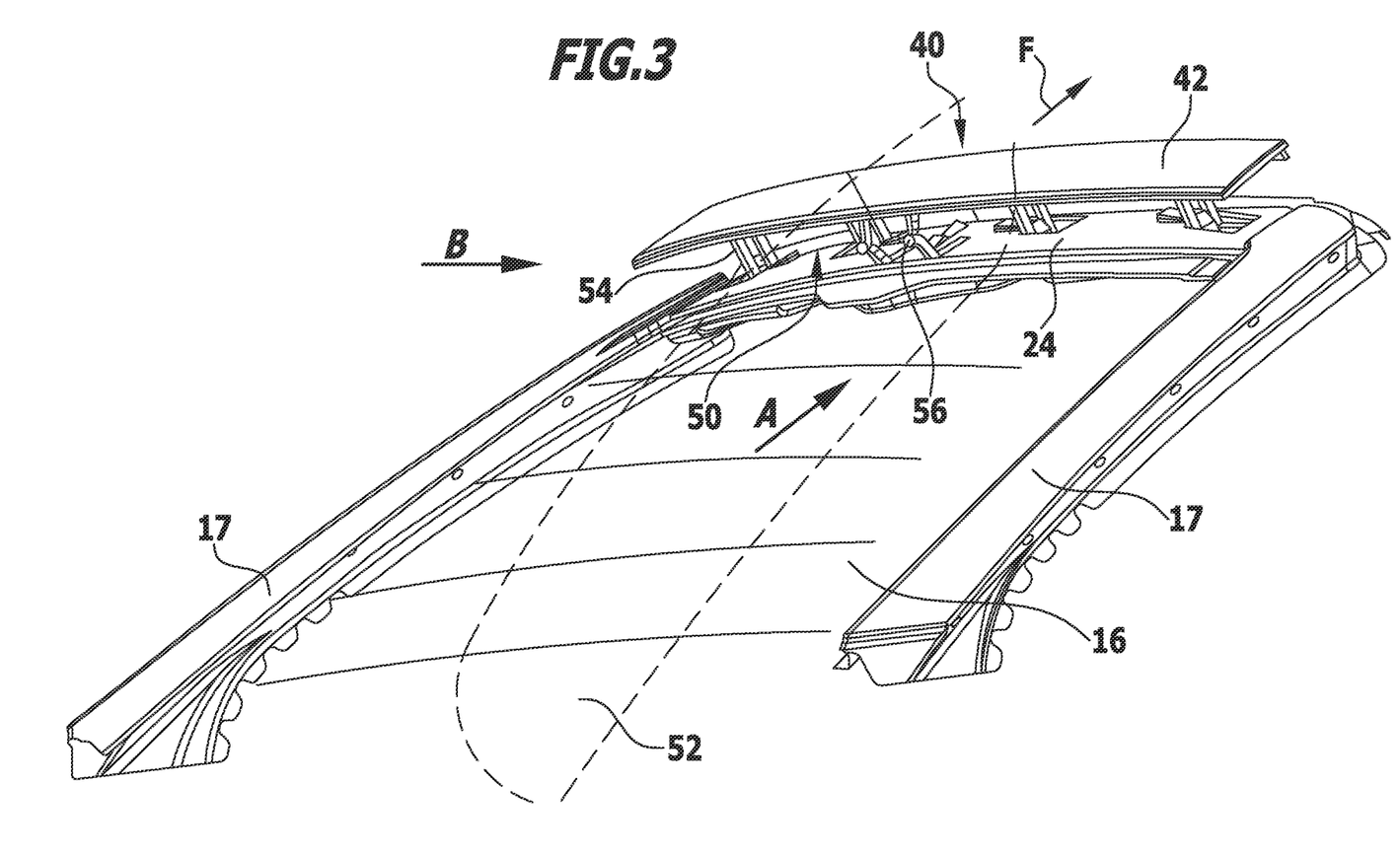
FIG. 3 shows a perspective view similar to FIG. 2 of a wind deflector with a wind deflector body in an extended position.

As illustrated in FIGS. 2 and 3, the windshield 16 is adjoined, between A pillars 17 of the vehicle body 12, by a front area 24 of the vehicle roof 18, wherein the vehicle roof 18, according to FIG. 1, is provided with a roof cutout 30 which can be closed, follows on from the front area 24 and can be closed or opened up by a movable roof section which is not illustrated. Such a movable roof section can be formed, for example, by a folding roof or a retractable or a detachable roof.

The roof cutout 30 extends over part of the vehicle roof 18 and has, contrary to the direction of travel F, an extension which is greater than an extension of a closed roof section which possibly still remains.

In order to avoid the effects of drafts in the interior of the vehicle body 12 when the roof cutout 30 is open, in particular in the area of the passengers, a wind deflector 40 is provided between the windshield 16 and a front edge 32 of the roof cutout 30 in the front area 24 connecting the A pillars 17 and this wind deflector has a wind deflector body 42 which, as illustrated in FIG. 2, can be positioned in a retracted position such that an upper side 44 of the wind deflector body is aligned with a contour 46 of the upper side of the vehicle body 12 at the transition between windshield 16 and vehicle roof 18 and in the front area 24, i.e. does not project beyond it and does not impair the overall optical impression of the contour 46 of the upper side.

In this position, the wind deflector body 42 is, however, inoperative.

As illustrated in FIG. 3, the wind deflector body 42 can be moved into an extended position, in which the wind deflector body 42 brings about guidance of a flow of air 48 over the vehicle roof 18 in such a manner that the flow of air 48 does not enter the interior of the vehicle body 12 through the roof cutout 30 or only to a limited extent.

For this purpose, as illustrated in FIG. 3, a lifting device 50 is provided which has, for example, lifting units 54 which are arranged symmetrically to a longitudinal central plane 52 of the vehicle body 12 and on both sides thereof as well as a guiding unit 56 for the wind deflector body 42.

Figure 4:
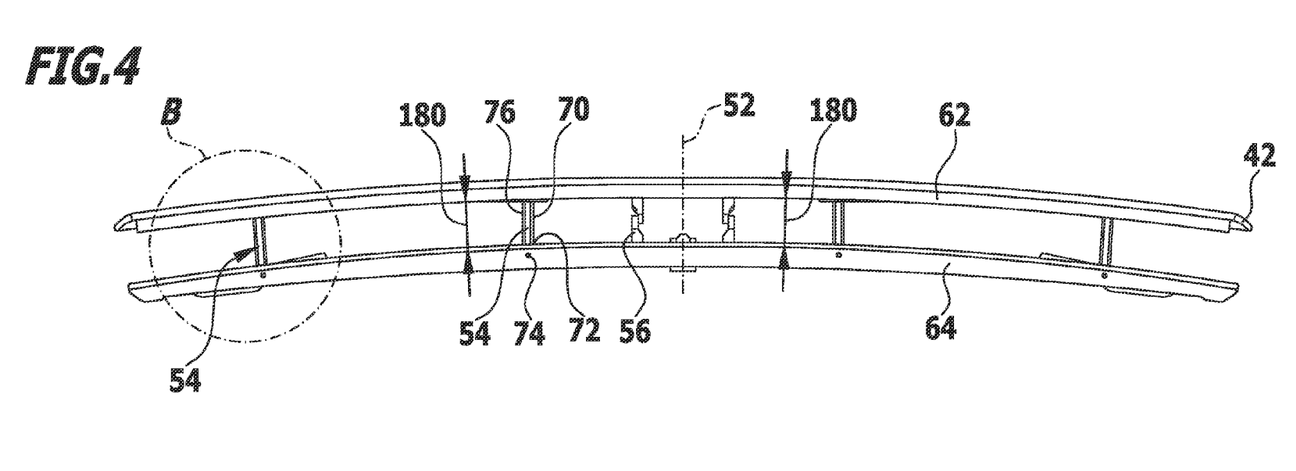
FIG. 4 shows a view in the direction of arrow A in FIG. 3 of the wind deflector according to the invention in the extended position.
Figure 5:
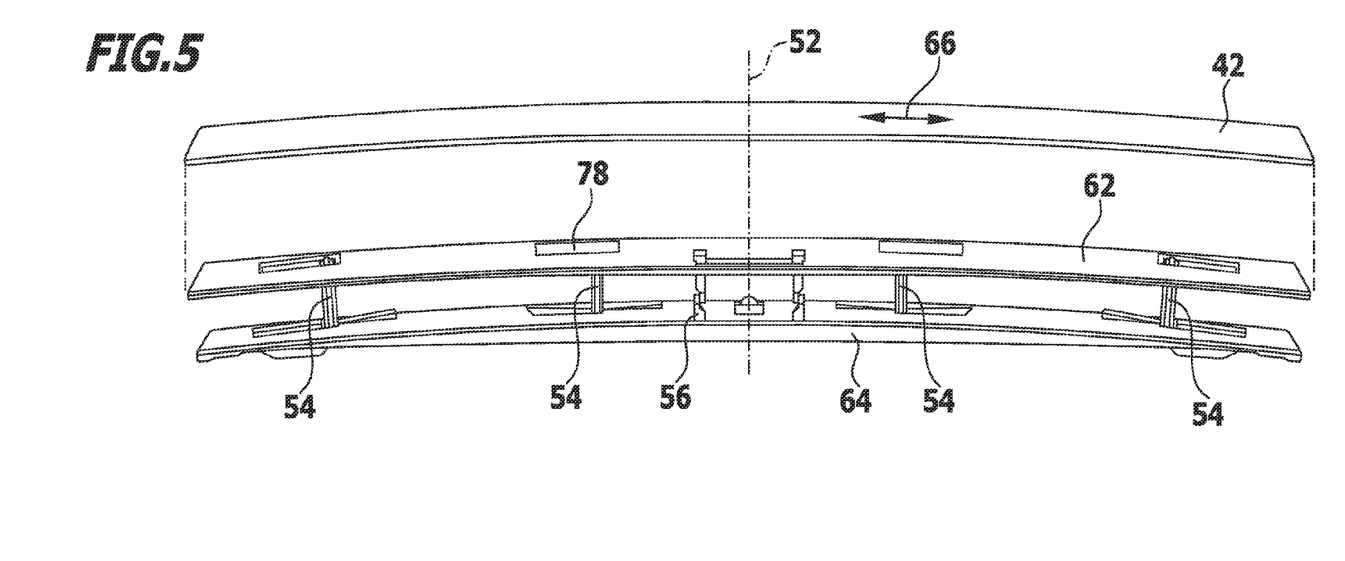
FIG. 5 shows a view in the direction of arrow B in FIG. 3 with an exploded illustration of the wind deflector according to the invention with a wind deflector body in an extended position.

As illustrated in FIG. 4 and FIG. 5, the wind deflector body 42 is held, for example, by a support 62 which can be moved by the lifting units 54, for example, two respective lifting units 54 arranged on either side of the longitudinal central plane 52 and symmetrically to it, relative to a mounting base 64 which is integrated in the front area 24 of the vehicle roof 18 between the windshield 16 and the front edge 32 of the roof cutout 30, wherein the respective lifting units 54 are arranged on the mounting base 64 and, depending on the position thereof, hold the support 62 in the extended position illustrated in FIGS. 4 and 5 or move the support 62 into a retracted position, in which the support 62 is arranged at a slight distance from the mounting base 64 or rests on it.

In addition, the guiding unit 56 is designed such that it guides the support 62 together with the wind deflector body 42 so as to be non-displaceable transversely to the longitudinal central plane 52, wherein the function of the guiding unit 56 will be explained in detail in the following.

As illustrated in FIGS. 4 and 5, each of the lifting units 54 comprises a lifting arm 70 which is mounted on the mounting base 64 with a first end 72 so as to rotatable about a first pivot axis 74 and engages with another second end 76 on a retaining guide 78 of the support 62.

Figure 6:
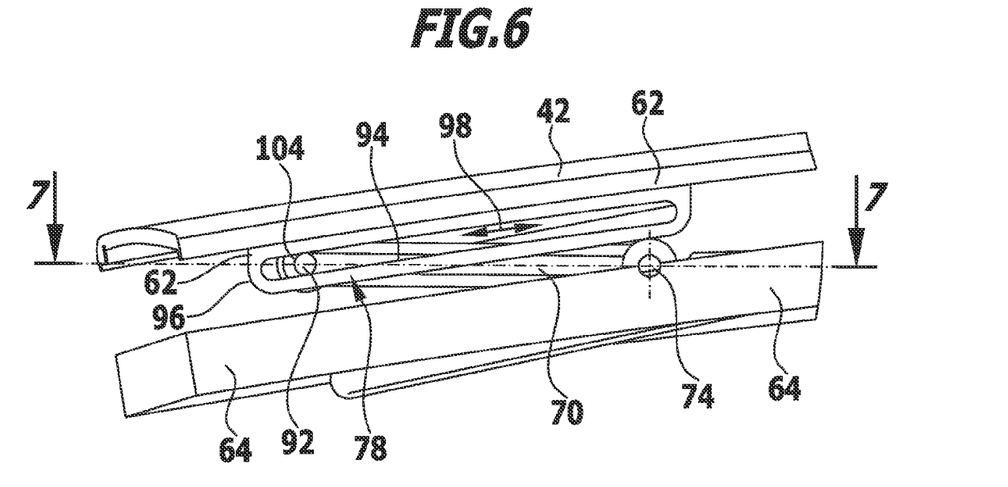
FIG. 6 shows an enlarged partial view of an area B in FIG. 4 with illustration of the wind deflector body in its retracted position.
Figure 7:
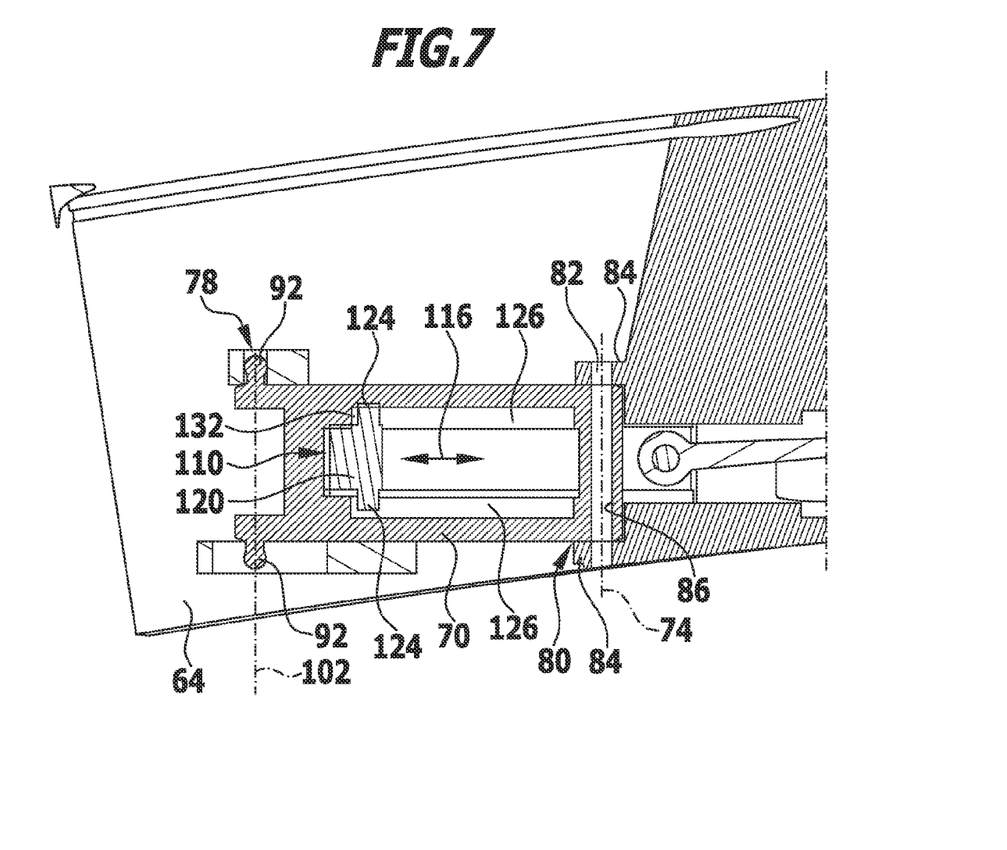
FIG. 7 shows a section along line 7-7 in FIG. 6.
Figure 8:
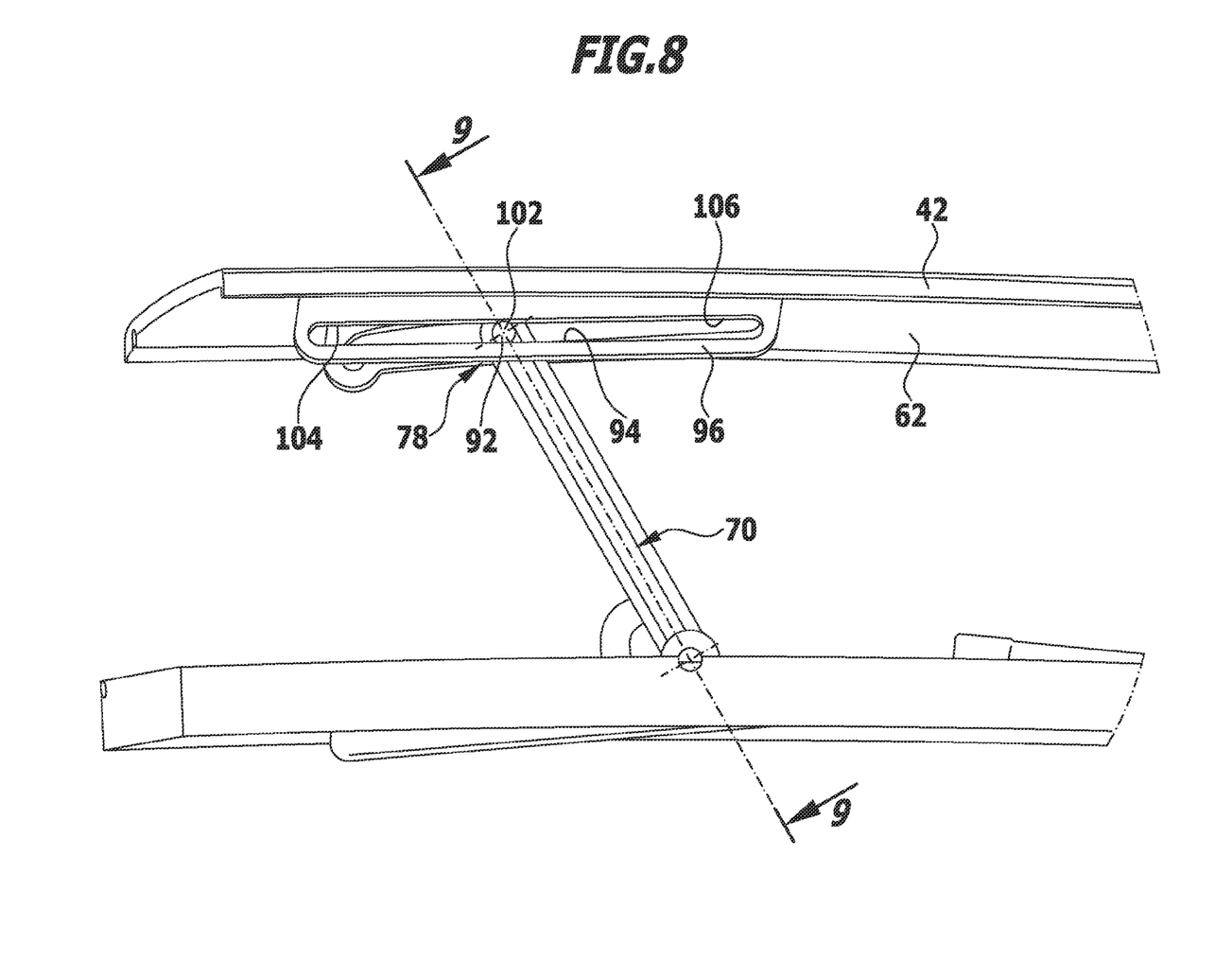
FIG. 8 shows a view similar to FIG. 6 with illustration of the wind deflector body in an intermediate position between the retracted and the extended positions.
Figure 9:
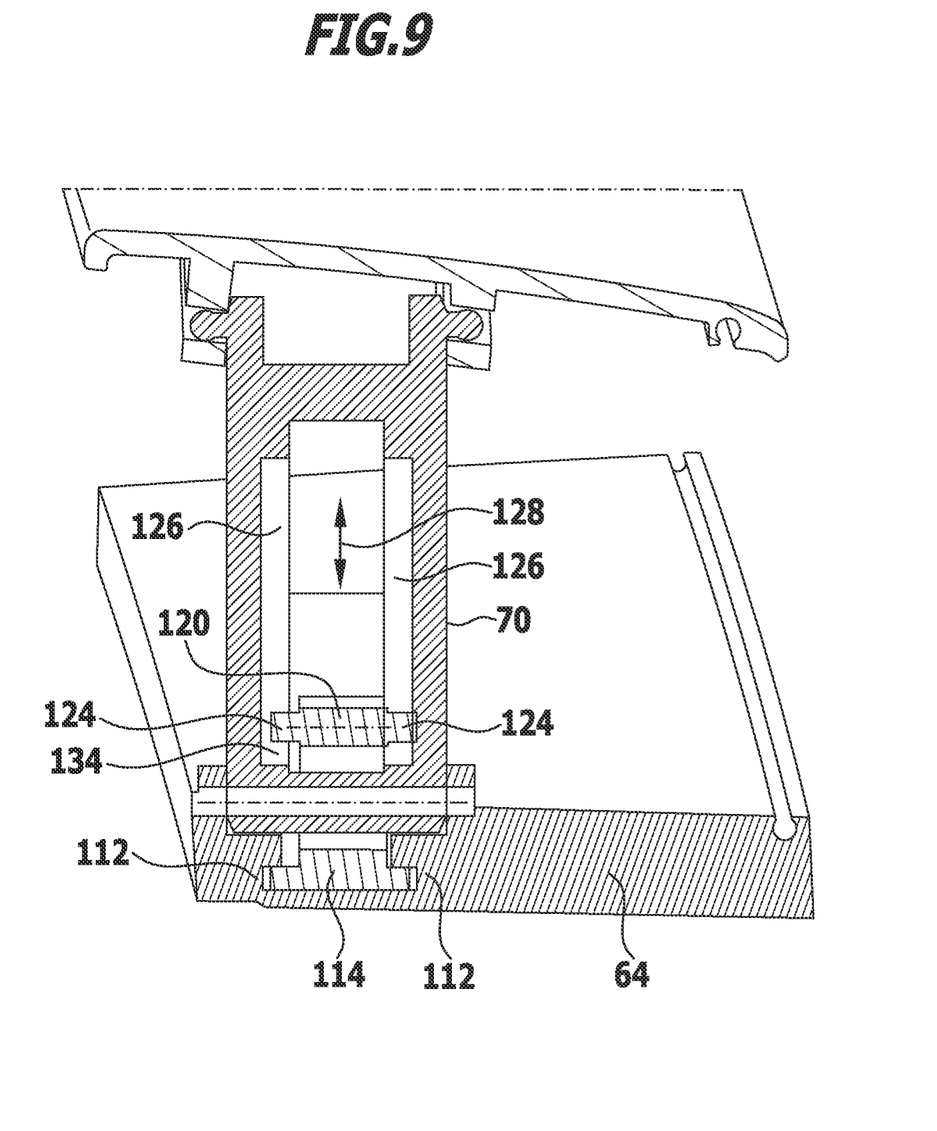
FIG. 9 shows a section along line 9-9 in FIG. 8.

As illustrated in FIGS. 6 and 7 which show the retracted position of a lifting unit as well as in FIGS. 8 and 9 which show the extended position of a lifting unit, the first pivot axis 74, about which the respective lifting arm 70 is pivotable relative to the mounting base 64, extends approximately parallel to the longitudinal central plane 52.

In the retracted position, the lifting arm 70 is pivoted to such an extent in the direction of the mounting base 64 that it forms with the mounting base 64, for example, an angle of <20°, even better an angle of <15°.

In this respect, the lifting arm 70 extends relative to the mounting base 64 away from a lifting arm bearing 80 determining the first pivot axis 74 as far as the retaining guide 78 which is connected to the support 62 for the wind deflector body 42.

For example, the lifting arm bearing 80 is formed by a bolt 82 which passes through receptacles 84 in the mounting base 64 and penetrates a bolt receptacle 86 which is provided in the respective lifting arm 70.

The bolt 82 is, for example, rotatable either in the receptacles 84 or in the bolt receptacle 86 so that, as a result, pivoting of the lifting arm 70 relative to the mounting base 64 is possible.

The retaining guide 78 is formed by guide pins 92 which project from the lifting arm 70 on both sides thereof and of which each of the guide pins 92 engages in a connecting link path 94 of a guide bar 96 of the retaining guide 78, wherein the guide bar 96 is held on the support 62.

The guide pin 92 is, therefore, on the one hand movable in a longitudinal direction 98 of the connecting link path 94 and rotatable about a second pivot axis 102 relative to the connecting link path 94 and, therefore, also to the guide bar 96.

The second pivot axis 102 extends, in particular, parallel to the first pivot axis 74 and both pivot axes 74 and 102 are preferably aligned essentially parallel to the longitudinal central plane 52, i.e. they form with the longitudinal central plane 52 at best an angle of at the most 10° while the wind deflector body 42 extends with its direction of extension 66 transversely to the longitudinal central plane 52 and, therefore, also transversely to the pivot axes 74 and 102.

By pivoting the lifting arms 70 about the pivot axis 74, the wind deflector body 42 with the support 62 may be moved from the retracted position illustrated in FIGS. 6 and 7 into the extended position illustrated in FIGS. 8 and 9, wherein the retaining guide 78 offers the possibility of the guide pins 92, on the one hand, being able to turn about the second pivot axis 102 relative to the guide bar 96 and, at the same time, being able to migrate along the connecting link path 94 of the guide bar 96 from one end area 104 of the connecting link path 94, for example an end area 104 of the connecting link path 94 located outwards with respect to the longitudinal central plane 52, into an oppositely located end area 106 of the connecting link path 94, for example an end area 106 of the connecting link path 94 located inwards with respect to the longitudinal central plane 52.

As a result, the second ends 76 of the lifting arms 70 may be moved relative to the support 62 without the support 62 experiencing any displacement transversely to the longitudinal central plane 52.

An actuating unit designated as a whole as 110 is provided for pivoting the respective lifting arm 70 of the respective lifting unit 54.

This actuating unit 110 comprises a displaceable slide 114 which is guided for displacement in the mounting base 64 by a displacement guide 112, wherein the displaceable slide 114 is preferably guided on both sides by a respective displacement guide 112 and, therefore, can be moved in a direction of displacement 116 which extends transversely, preferably at right angles, to the first pivot axis 74.

An actuating arm 120 extends from the displaceable slide 114 and this, as illustrated in FIGS. 7 and 9, bears at one end area 122 facing away from the displaceable slide 114 lateral extensions 124 which engage in sliding guide paths 126 extending along the respective lifting arm 70 and can, therefore, be moved along the sliding guide paths 126 in a longitudinal direction 128 of the respective lifting arm 70.

The extensions 124 are arranged, for example, relative to the displaceable slide 114 such that the extensions 124 can move along a path 130 which runs parallel to the displacement guides 112 but at a distance from them and preferably such that the path 130 extends on a side of the first pivot axis 74 facing the wind deflector body 42.

The movement of the extensions 124 along the path 130 results, when the extensions 124 have a maximum distance from the pivot axis 74, in the extensions 124, as illustrated, for example, in FIG. 7, being located in an end area 132 of the sliding guide paths 126 which is located closest to the retaining guide 78 so that, in this case, the respective lifting arm 70 forms a minimum angle with the mounting base 64 while the extensions 124, when they have the smallest distance from the pivot axis 74, as illustrated in FIG. 9, are located in an end area 134 of the sliding guide paths 126 which is arranged closest to the first pivot axis 74.

Figure 10:
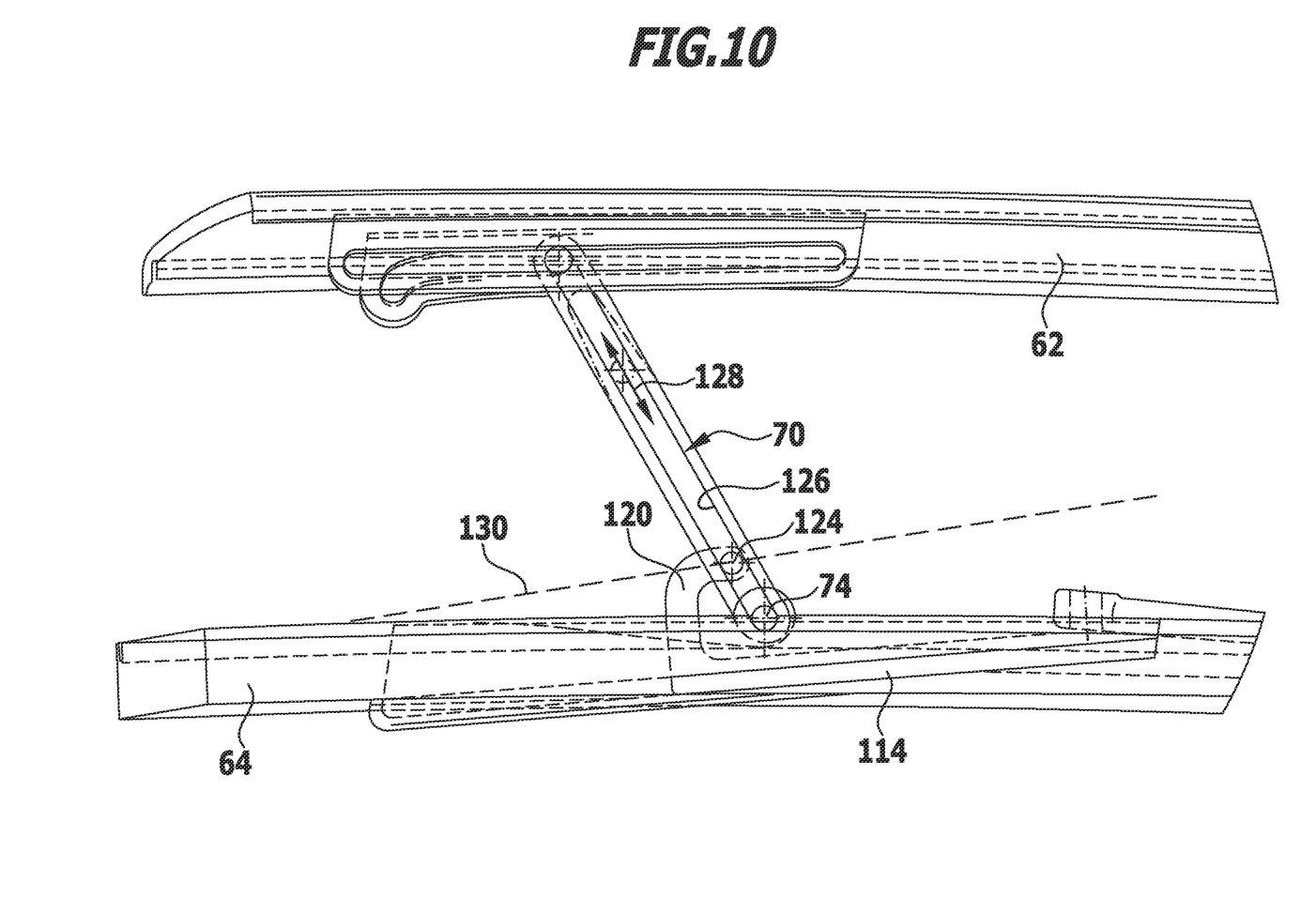
FIG. 10 shows a view similar to FIG. 8 with parts not apparent in FIG. 8 and illustrated by dashed lines.

As a result, displacement of the actuating arm 120 leads as a result of displacement of the displaceable slide 114 to either the lifting arm 70 being in the refracted position, as illustrated in FIGS. 6 and 7, or moving from this retracted position in the direction of the extended position, as illustrated in FIGS. 8 to 10, wherein the actuating arm 120 is moved, for example, to such an extent in the direction of the first pivot axis 74 that the respective lifting arm 70 extends with an angle close to 90° in relation to the mounting base 64, i.e. transversely, as far as possible at right angles, to it.

In order to be able to position the lifting arm 70 in the refracted position with as small an angle relative to the mounting base 64 as possible, the path 130 preferably extends at an angle to the mounting base 64, namely such that the extensions 124 are arranged in the retracted position at as small a distance relative to the mounting base 64 as possible while the distance of the extensions 124 from the mounting base 64 increases with increasing movement in the direction of the extended position.

Figure 11:
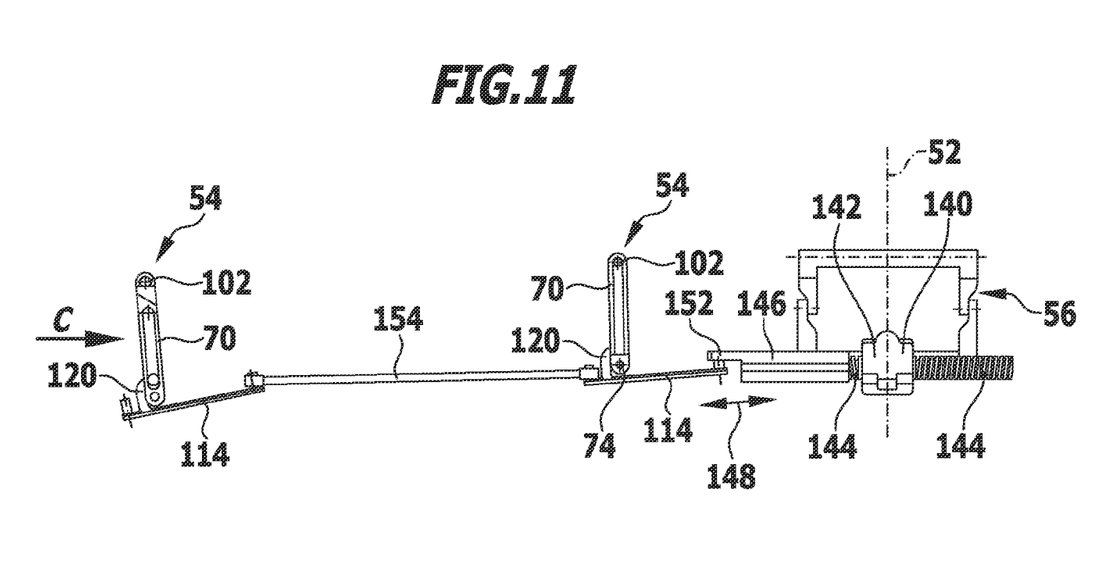
FIG. 11 shows a schematic partial illustration of lifting units arranged on one side of the longitudinal central plane in a perspective view similar to FIG. 4 with a drive unit and a position of the lifting arms which corresponds to the extended position of the wind deflector body.
Figure 12:
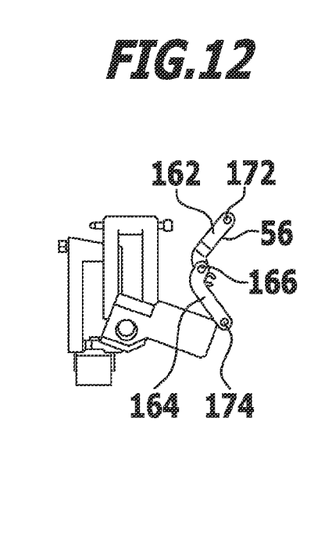
FIG. 12 shows a view in the direction of arrow C in FIG. 11.
Figure 13:
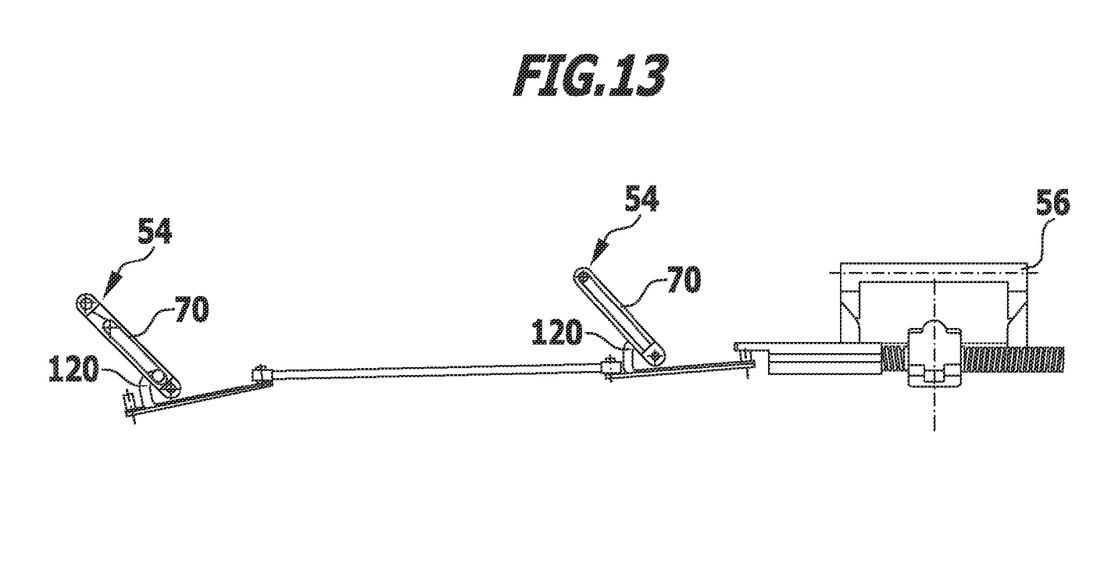
FIG. 13 shows a view similar to FIG. 11 with a position of the lifting arms which lies between the extended and the retracted positions of the wind deflector body.
Figure 14:
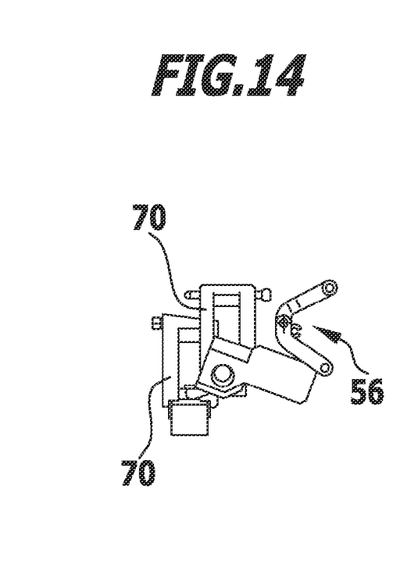
FIG. 14 shows an illustration similar to FIG. 12 in the position in FIG. 13.
Figure 15:
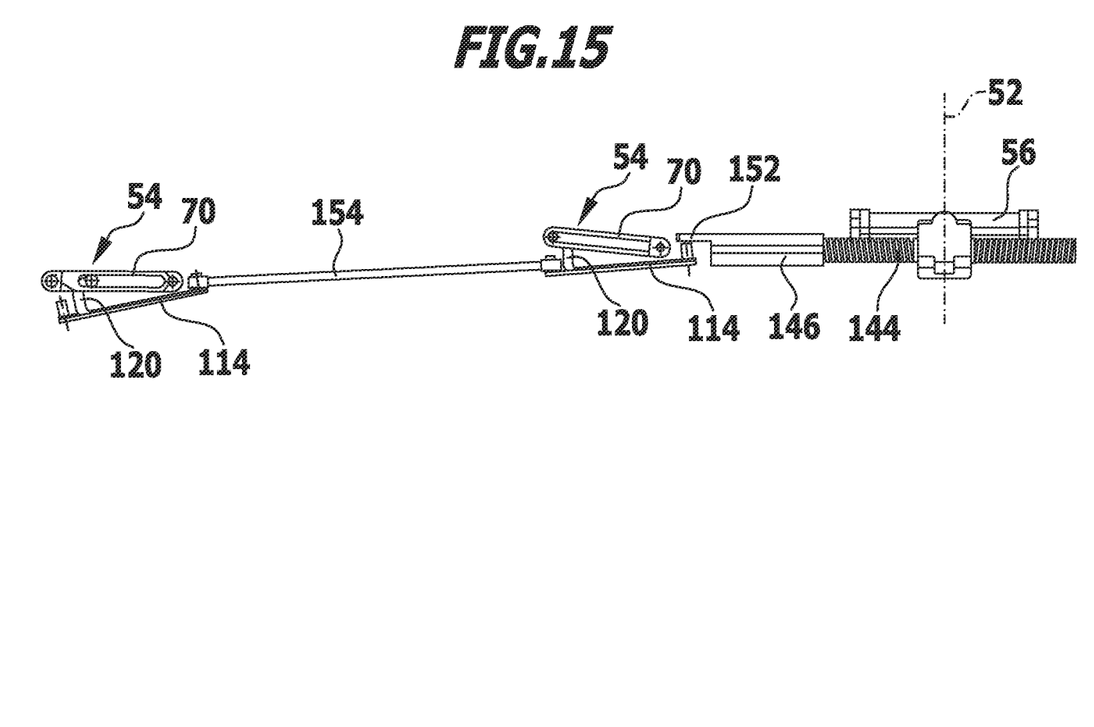
FIG. 15 shows an illustration similar to FIG. 11 with a position of the lifting arms which corresponds to the retracted position of the wind deflector body.
Figure 16:
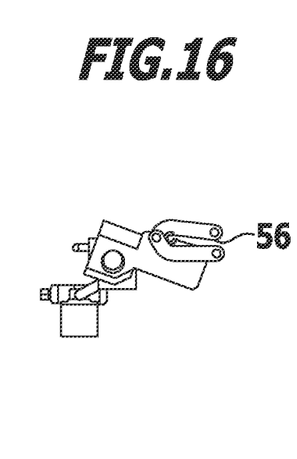
FIG. 16 shows a view similar to FIG. 12 of the position in FIG. 15.

The function of the entire lifting device 50 may be explained, in particular, on the basis of the schematic illustrations according to FIGS. 11, 13 and 15, supplemented by FIGS. 12, 14 and 16.

In order to enable a motor-driven movement of the individual lifting units 54, a central drive unit 140 is preferably provided and this has, for example, a drive motor 142 which drives drive spindles 144 which extend on respective, oppositely located sides of the longitudinal central plane 52 and preferably transversely, in particular at right angles, to the longitudinal central plane 52.

Spindle nuts 146 are seated on these drive spindles 144 and may be displaced in a direction of displacement 148 either away from the drive unit 140 or towards it when the drive spindles are rotated.

The respective spindle nuts 146 arranged on either side of the longitudinal central plane are coupled via coupling rods 152 and 154 to the displaceable slides 114 of the lifting units 54 respectively located on one side of the longitudinal central plane 52 and so the displaceable slides 114 which are respectively located on one side of the longitudinal central plane 52 and, therefore, also the actuating arms 120 thereof may be displaced together and synchronously either away from the longitudinal central plane 52 or towards it.

If, as illustrated in FIG. 11, the actuating arms 120 are displaced into their position located closest to the longitudinal central plane 52, the extensions 124 arranged on the actuating arms 120 have the effect that the respective lifting arms 70 extend transversely to the displaceable slides 114 and, therefore, also transversely to the mounting base 64 and are in their extended position, in which the lifting arms 70, without this being illustrated in FIG. 11, hold the wind deflector body 42 in its maximum extended position.

If the spindle nuts 146 are now moved away from the longitudinal central plane 52 as a result of the drive spindles 144 being rotated, the actuating arms 120 with the extensions 124 also move away from the longitudinal central plane 52 and cause, as illustrated, for example, in FIG. 13, an increasing inclination of the lifting arms 70 of the respective lifting units 54 and, therefore, a reduction in the angle between them and the mounting base 64.

The movement of the actuating arms 120 is brought about in the direction away from the longitudinal central plane 52 for such a time until the actuating arms 70 of the individual lifting units 54, as illustrated in FIG. 15, form the smallest angle with the mounting base and, therefore, move the wind deflector body 42 into the retracted position and keep it in this position, wherein, in this case, the actuating arms 120 are also positioned at a maximum distance from the longitudinal central plane 52.

Supplementary to FIGS. 11, 13 and 15, the functioning of the guiding unit 56 can also be explained in FIGS. 12, 14 and 16.

The guiding unit 56 is designed such that it comprises two toggle lever arms 162 and 164 which, for their part, are connected by a joint 166 with an articulated axle 168 and, on the other hand, are connected at their outer ends via joints 172 and 174 with articulated axles 176 and 178, one time to the support 62 and another time to the mounting base 64.

In this respect, the articulated axles 168, 176 and 178 run parallel to one another and preferably transversely to the first pivot axes 74, in particular at right angles to them, and, therefore preferably also at right angles to the longitudinal central plane 52.

As a result, the guiding unit 56, on account of its arrangement and effect between the support 62 of the wind deflector body 42 and the mounting base 64, prevents any movement of the support 62 and the wind deflector body 42 relative to the mounting base 64 transversely to the longitudinal central plane 52 since the toggle lever arms 162 and 164 prevent movements in the direction of the articulated axles 168, 176 and 178 whereas they allow other movements at right angles to the articulated axles 168, 176 and 178.

These other movement are, however, prevented by the lifting units 54, insofar as they would run parallel to the pivot axes 74 and 102, on account of the fact that the first pivot axes 74 and the second pivot axes 102 extend transversely to the direction of extension 66 of the support 62 and the wind deflector body 42.

As a result, on account of the alignment of the articulated axles 168, 176 and 178 of the guiding unit 56 and the pivot axes 74 and 102 of the lifting units 54 relative to one another, only movements of the support 62 of the wind deflector body 42 are possible overall which extend at right angles to the articulated axles 168, 176 and 178 and the pivot axes 74 and 102 and, therefore, transversely to the mounting base 64 in a lifting direction 180 which extends parallel to the longitudinal central plane 52.

As a result of the alignment of the articulated axles 168, 176 and 178 transversely or at right angles to the pivot axes 74 and 102 of the lifting units 54 it is ensured that the support 62 with the wind deflector body 42 can be moved in the lifting direction 180 only away from the mounting base 64 into the extended position and in the direction of the mounting base 64, i.e. into the retracted position.

The invention claimed is:

1. Wind deflector for installation in a vehicle roof in a front area of the vehicle roof, comprising a wind deflector body extending in a direction of extension transversely to a direction of travel, a lifting device for moving the wind deflector body between a position retracted into the vehicle roof and a position extended out of the vehicle roof and projecting beyond a contour of an upper side of the vehicle roof and thus deflecting wind, wherein the lifting device has at least one lifting unit with a mounting base and a lifting arm mounted with a lifting arm bearing for pivoting about a first pivot axis relative to the mounting base, said first pivot axis extending transverse to said direction of extension of said wind deflector, said lifting arm engaging on the wind deflector body at an end located opposite the lifting arm bearing, wherein an actuating unit supported on the mounting base and engaging on the lifting arm is provided for moving the lifting arm and wherein the actuating unit and the lifting arm bearing are displaceable relative to one another in a direction of displacement extending transversely to the first pivot axis of the lifting arm bearing for the purpose of pivoting the lifting arm.

2. Wind deflector as defined in claim 1, wherein a displaceable slide displaceable in the direction of displacement is provided for the displacement of the actuating unit and the lifting arm bearing relative to one another.

3. Wind deflector as defined in claim 2, wherein the displaceable slide is guided on the mounting base by means of a displacement guide.

4. Wind deflector as defined in claim 1, wherein the actuating unit engages on a guide path of the lifting arm with a guiding element displaceable along the guide path and wherein the guiding element is movable along the guide path for the purpose of pivoting the lifting arm.

5. Wind deflector as defined in claim 4, wherein the guide path extends in longitudinal direction of the lifting arm.

6. Wind deflector as defined in claim 4, wherein the guiding element is pivotable relative to the guide path.

7. Wind deflector as defined in claim 4, wherein the actuating unit has an actuating arm bearing the guiding element and extending from an actuating base.

8. Wind deflector as defined in claim 7, wherein a displaceable slide displaceable in the direction of displacement relative to lifting arm bearing forms the actuating base.

9. Wind deflector for installation in a vehicle roof in a front area of the vehicle roof, comprising a wind deflector body extending in a direction of extension transversely to a direction of travel, a lifting device for moving the wind deflector body between a position retracted into the vehicle roof and a position extended out of the vehicle roof and projecting beyond a contour of an upper side of the vehicle roof and thus deflecting wind, wherein the lifting device has at least one lifting unit with a mounting base and a lifting arm mounted with a lifting arm bearing for pivoting about a first pivot axis relative to the mounting base, said first pivot axis extending transverse to said direction of extension of said wind deflector, said lifting arm engaging on the wind deflector body at an end located opposite the lifting arm bearing, wherein the lifting arm is coupled to the wind deflector body with its end engaging on the wind deflector body by means of a retaining guide and holds said body in the respective positions relative to the mounting base.

10. Wind deflector as defined in claim 9, wherein the lifting arm is pivotable relative to the wind deflector body about a second pivot axis parallel to the first pivot axis as a result of the retaining guide.

11. Wind deflector as defined in claim 10, wherein the second pivot axis extends transversely to the direction of extension of the wind deflector body.

12. Wind deflector as defined in claim 9, wherein the retaining guide allows pivoting of the lifting arm about a second pivot axis and movement of the second pivot axis in the direction of extension of the wind deflector body.

13. Wind deflector as defined in claim 9, wherein the retaining guide has a connecting link path, a guide pin forming the second pivot axis being movable along said path.

14. Wind deflector for installation in a vehicle roof in a front area of the vehicle roof, comprising a wind deflector body extending in a direction of extension transversely to a direction of travel, a lifting device for moving the wind deflector body between a position retracted into the vehicle roof and a position extended out of the vehicle roof and projecting beyond a contour of an upper side of the vehicle roof and thus deflecting wind, wherein the lifting device has at least one lifting unit with a mounting base and a lifting arm mounted with a lifting arm bearing for pivoting about a first pivot axis relative to the mounting base, said first pivot axis extending transverse to said direction of extension of said wind deflector, said lifting arm engaging on the wind deflector body at an end located opposite the lifting arm bearing, wherein the wind deflector body is guided by a guiding unit preventing any movement of the wind deflector body in the direction of extension.

15. Wind deflector as defined in claim 14, wherein the guiding unit has a toggle lever guide.

16. Wind deflector for installation in a vehicle roof in a front area of the vehicle roof, comprising a wind deflector body extending in a direction of extension transversely to a direction of travel, a lifting device for moving the wind deflector body between a position retracted into the vehicle roof and a position extended out of the vehicle roof and projecting beyond a contour of an upper side of the vehicle roof and thus deflecting wind, wherein the lifting device has at least one lifting unit with a mounting base and a lifting arm mounted with a lifting arm bearing for pivoting about a first pivot axis relative to the mounting base, said lifting arm engaging on the wind deflector body at an end located opposite the lifting arm bearing, wherein the wind deflector body is guided by a guiding unit preventing any movement of the wind deflector body in the direction of extension,
wherein the guiding unit has a toggle lever guide; and
wherein the toggle lever guide is pivotable about articulated axles extending transversely to a first pivot axis.

17. Wind deflector as defined in claim 16, wherein the articulated axles of the toggle lever guide extend at right angles to the first pivot axis.

18. Wind deflector as defined in claim 14, wherein the lifting device has several lifting units.

19. Wind deflector as defined in claim 18, wherein the several lifting units are arranged symmetrically to a longitudinal central plane of the vehicle roof.

20. Wind deflector as defined in claim 14, wherein the at least one lifting unit is drivable by a common drive unit.

21. Wind deflector for installation in a vehicle roof in a front area of the vehicle roof, comprising a wind deflector body extending in a direction of extension transversely to a direction of travel, a lifting device for moving the wind deflector body between a position retracted into the vehicle roof and a position extended out of the vehicle roof and projecting beyond a contour of an upper side of the vehicle roof and thus deflecting wind, wherein the lifting device has at least one lifting unit with a mounting base and a lifting arm mounted with a lifting arm bearing for pivoting about a first pivot axis relative to the mounting base, said lifting arm engaging on the wind deflector body at an end located opposite the lifting arm bearing, wherein the wind deflector body is guided by a guiding unit preventing any movement of the wind deflector body in the direction of extension; and wherein the drive unit is arranged in a central region of the wind deflector.

22. Wind deflector as defined in claim 20, wherein the drive unit is designed as a linear drive.

23. Wind deflector as defined in claim 20, wherein the at least one lifting unit comprises a plurality of lifting units; and wherein the drive unit drives the lifting units arranged on oppositely located sides thereof synchronously with one another.

24. Wind deflector as defined in claim 20, wherein the drive unit performs push-pull movements extending symmetrically to a longitudinal central plane of the vehicle roof.

25. Wind deflector as defined in claim 21, wherein the drive unit is designed as a linear drive.

26. Wind deflector as defined in claim 21, wherein the at least one lifting unit comprises a plurality of lifting units; and wherein the drive unit drives the lifting units arranged on oppositely located sides thereof synchronously with one another.

27. Wind deflector as defined in claim 21, wherein the drive unit performs push-pull movements extending symmetrically to a longitudinal central plane of the vehicle roof.

* * * * *